: US 11,658,353 B2
(45) Date of Patent: May 23, 2023

(12) United States Patent
Iguchi

(54) METHOD OF PRODUCING LITHIUM-ION BATTERY

(71) Applicant: TOYOTA JIDOSHA KABUSHIKI KAISHA, Toyota (JP)

(72) Inventor: Hiroki Iguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 17/108,100

(22) Filed: Dec. 1, 2020

(65) Prior Publication Data
US 2021/0184276 A1 Jun. 17, 2021

(30) Foreign Application Priority Data

Dec. 11, 2019 (JP) .............................. JP2019-223651

(51) Int. Cl.
H01M 10/44 (2006.01)
H01M 4/131 (2010.01)
H01M 10/058 (2010.01)
H01M 4/133 (2010.01)
H01M 4/02 (2006.01)

(52) U.S. Cl.
CPC ......... *H01M 10/446* (2013.01); *H01M 4/131* (2013.01); *H01M 4/133* (2013.01); *H01M 10/058* (2013.01); *H01M 2004/027* (2013.01)

(58) Field of Classification Search
CPC ... H01M 10/446; H01M 4/483; H01M 10/058
See application file for complete search history.

(56) References Cited

FOREIGN PATENT DOCUMENTS

JP 2017-004727 A 1/2017
JP 2018190582 * 11/2018

OTHER PUBLICATIONS

English translation of JP 2018-190582 obtained via Google Patents Sep. 28, 2022 (Year: 2018).*

* cited by examiner

*Primary Examiner* — Sarah A. Slifka
(74) *Attorney, Agent, or Firm* — Oliff PLC

(57) ABSTRACT

A negative electrode active material includes graphite and silicon oxide. On a rectangular coordinate system having an SOC of the battery on a horizontal axis and a dimension of the battery on a vertical axis, a charging profile of the battery includes a first stage and a second stage. When the battery is charged at a current rate equal to or higher than an inherent current rate, a first slope is less steep than a second slope. When the battery is charged at a current rate lower than the inherent current rate, the first slope is steeper than the second slope. During the initial charging, at least charging in the first stage is performed at a current rate lower than the inherent current rate. After the initial charging proceeds to the second stage, the thermal aging is performed at an SOC included in the second stage.

4 Claims, 4 Drawing Sheets

METHOD OF PRODUCING LITHIUM-ION BATTERY

This nonprovisional application is based on Japanese Patent Application No. 2019-223651 filed on Dec. 11, 2019, with the Japan Patent Office, the entire contents of which are hereby incorporated by reference.

BACKGROUND

Field

The present disclosure relates to a method of producing a lithium-ion battery.

Description of the Background Art

Japanese Patent Laying-Open No. 2017-004727 discloses a lithium-ion battery including a silicon-based active material ($SiO_x$: $0.5 \leq x \leq 1.6$) and a carbon-based active material as negative electrode active materials.

SUMMARY

Research has been underway to increase the capacity of lithium-ion batteries (which may be simply called "battery" hereinafter). As a potential solution, use of silicon oxide (SiO) has been considered. SiO is a negative electrode active material. Conventionally, graphite is used as a negative electrode active material. SiO may have a high specific capacity compared to graphite. Use of SiO may increase battery capacity.

However, SiO tends to have a short cycle life compared to graphite. Achieving a desired cycle life with an SiO single-component system is difficult. To address this problem, a graphite-SiO mixed system has been proposed. A graphite-SiO mixed system may have a long cycle life compared to an SiO single-component system. Still, further improvement of cycle life is demanded.

An object of the present disclosure is to enhance the cycle life in a graphite-SiO mixed system.

In the following, the technical structure and the effects according to the present disclosure are described. It should be noted that the action mechanism according to the present disclosure includes presumption. The scope of claims is not limited by whether or not the action mechanism is correct.

[1] A method of producing a lithium-ion battery includes the following (a), (b), and (c):
(a) assembling a battery;
(b) performing initial charging of the battery; and
(c) performing thermal aging of the battery.

The battery includes a negative electrode active material. The negative electrode active material includes graphite and silicon oxide.

On a rectangular coordinate system having a state of charge of the battery on a horizontal axis and a dimension of the battery on a vertical axis, a charging profile of the battery includes a first stage and a second stage. The second stage has a high state of charge compared to the first stage. The charging profile has a first slope in the first stage and has a second slope in the second stage.

The battery has an inherent current rate. When the battery is charged at a current rate equal to or higher than the inherent current rate, the first slope is less steep than the second slope. When the battery is charged at a current rate lower than the inherent current rate, the first slope is steeper than the second slope.

During the initial charging, at least charging in the first stage is performed at a current rate lower than the inherent current rate.

After the initial charging proceeds to the second stage, the thermal aging is performed at a state of charge included in the second stage.

The negative electrode active material according to the present disclosure includes a graphite-SiO mixed system. During initial charging, silicon (Si) grows and forms a network within SiO. Thus, a Si network structure is formed. The denser the Si network structure is, the longer the cycle life tends to be. According to a novel finding of the present disclosure, it is considered that initial charging and thermal aging of a battery performed under particular conditions lead to formation of a dense Si network structure, which may lead to an enhanced cycle life.

FIG. 1 is a first example of a charging profile obtained with a graphite-SiO mixed system. FIG. 2 is a second example of a charging profile obtained with a graphite-SiO mixed system. The rectangular coordinate system in FIG. 1 and FIG. 2 has the state of charge (SOC) of the battery on the horizontal axis and the dimension of the battery on the vertical axis. The dimension may be the "thickness" and/or the like of the battery, for example.

Charging causes insertion of lithium (Li) into both graphite and SiO. Both graphite and SiO expand due to Li insertion. Expansion of the negative electrode active material increases the dimension of the battery. The expansion coefficient of SiO is greater than the expansion coefficient of graphite. It is considered that, in the SOC range where Li insertion into SiO is dominant, the slope of the curve is steeper. The slope is defined as the ratio of the increment of the dimension of the battery to the increment of SOC (dD/dSOC). The "curve" herein includes a line graph.

According to a novel finding of the present disclosure, the graphite-SiO mixed system has an inherent current rate ($I_0$). When the battery is charged at a current rate equal to or higher than the inherent current rate ($I_0$), the slope of the curve within the region with lower SOC is less steep and the slope of the curve within the region with higher SOC is steeper, as in the charging profile in FIG. 2.

When the battery is charged at a current rate lower than the inherent current rate ($I_0$), the slope of the curve within the region with lower SOC is steeper and the slope of the curve within the region with higher SOC is less steep, as in the charging profile in FIG. 1.

It is considered that the inherent current rate exists because SiO and graphite have different expansion coefficients and, in addition, SiO and graphite have different charging resistances (Li-accepting properties). The higher the charging resistance of SiO is, the smaller the inherent current rate tends to be. SiO reacts with Li at an electric potential that is noble compared to that for graphite. Therefore, it is considered that SiO is charged preferentially over graphite. However, when the charging resistance of SiO is higher, it is considered that graphite is preferentially charged. Even when the charging resistance of SiO is higher, if the current rate is sufficiently low, SiO may be charged preferentially. It is considered that the inherent current rate is determined by the balance between the charging resistance of SiO and the charging resistance of graphite.

According to the present disclosure, each of the charging profiles in FIG. 1 and FIG. 2 may be divided into "first stage (FS)" and "second stage (SS)".

The first stage (FS) is defined as the SOC region to the lower-SOC side of a boundary (B), at which the slope of the curve changes. The current rate in the first stage (FS) is defined as "first current rate ($I_1$)". The slope of the curve in the first stage (FS) is defined as "first slope ($S_1$)".

The second stage (SS) is defined as the SOC region to the higher-SOC side of the boundary (B), at which the slope of the curve changes, including the boundary (B). The current rate in the second stage (SS) is defined as "second current rate ($I_2$)". The slope of the curve in the second stage (SS) is defined as "second slope ($S_2$)".

As in FIG. 1, when relation "$I_1=I_2<I_0$" is satisfied, relation "$S_1>S_2$" is satisfied. As in FIG. 2, when relation "$I_1=I_2 \geq I_0$" is satisfied, relation "$S_1<S_2$" is satisfied.

According to the present disclosure, initial charging is performed at a first current rate ($I_1$) lower than the inherent current rate ($I_0$). In other words, relation "$I_1<I_0$" is satisfied. Under such conditions, the charging profile may appear as in the first stage (FS) in FIG. 1. It is considered that Li insertion into SiO then saturates in the first stage (FS).

After the initial charging proceeds to the second stage (SS), the thermal aging is performed at an SOC included in the second stage (SS). It is considered that thermal aging performed after saturation of Li insertion into SiO leads to formation of a dense Si network structure, which may lead to an enhanced cycle life.

[2] After the initial charging proceeds to the second stage, charging may be performed at a current rate equal to or higher than the inherent current rate.

After the completion of the charging in the first stage (FS), the second stage (SS) begins. In the first stage (FS), charging is performed at a first current rate ($I_1$) lower than the inherent current rate ($I_0$). In the second stage (SS), charging may be performed at a second current rate ($I_2$) that is also lower than the inherent current rate ($I_0$). In other words, relations "$I_1<I_0$" and "$I_2<I_0$" may be satisfied.

It is considered that Li insertion into SiO saturates in the first stage (FS) according to the present disclosure. It is considered that charging in the second stage (SS) has a minor influence on the Si network structure (namely, the cycle life). Therefore, in the second stage (SS), charging may be performed at a second current rate ($I_2$) that is equal to or higher than the inherent current rate ($I_0$). In other words, relations "$I_1<I_0$" and "$I_0 \leq I_2$" may be satisfied. This may reduce the time required for initial charging.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments of the present disclosure (hereinafter also called "present embodiment") are described. It should be noted that the description below does not limit the scope of claims.

In the present embodiment, phrases such as "from 0.1 parts by mass to 10 parts by mass" mean a range that includes the boundary values, unless otherwise specified. For example, the phrase "from 0.1 parts by mass to 10 parts by mass" means a range "not less than 0.1 parts by mass and not more than 10 parts by mass".

In the present embodiment, the magnitude of current rate is represented by "C". In the present embodiment, "1 C" is defined as a current rate at which a battery is fully discharged from its full charge capacity in one hour. For example, 0.1 C is 0.1 times the current rate 1 C.

<Method of Producing Lithium-Ion Battery>

Figure 5:
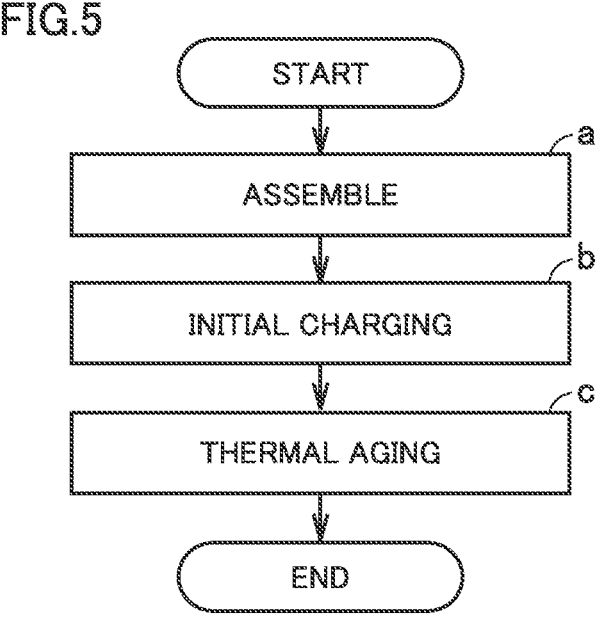
FIG. 5 is a schematic flowchart of a method of producing a lithium-ion battery according to the present embodiment.

FIG. 5 is a schematic flowchart of a method of producing a lithium-ion battery according to the present embodiment. The method of producing a lithium-ion battery according to the present embodiment includes <<(a) assembling>>, <<(b) initial charging>>, and <<(c) thermal aging>>.

<<(a) Assembling>>

The method of producing a lithium-ion battery according to the present embodiment includes assembling a battery.

The battery according to the present embodiment is a secondary battery in which Li ions serve as charge carriers (carriers). The battery according to the present embodiment may have any form. For example, the battery may be a prismatic battery, a cylindrical battery, or a pouch-type battery. The battery is assembled by any method. Herein, a prismatic battery is described as an example.

(Lithium-Ion Battery)

Figure 6:
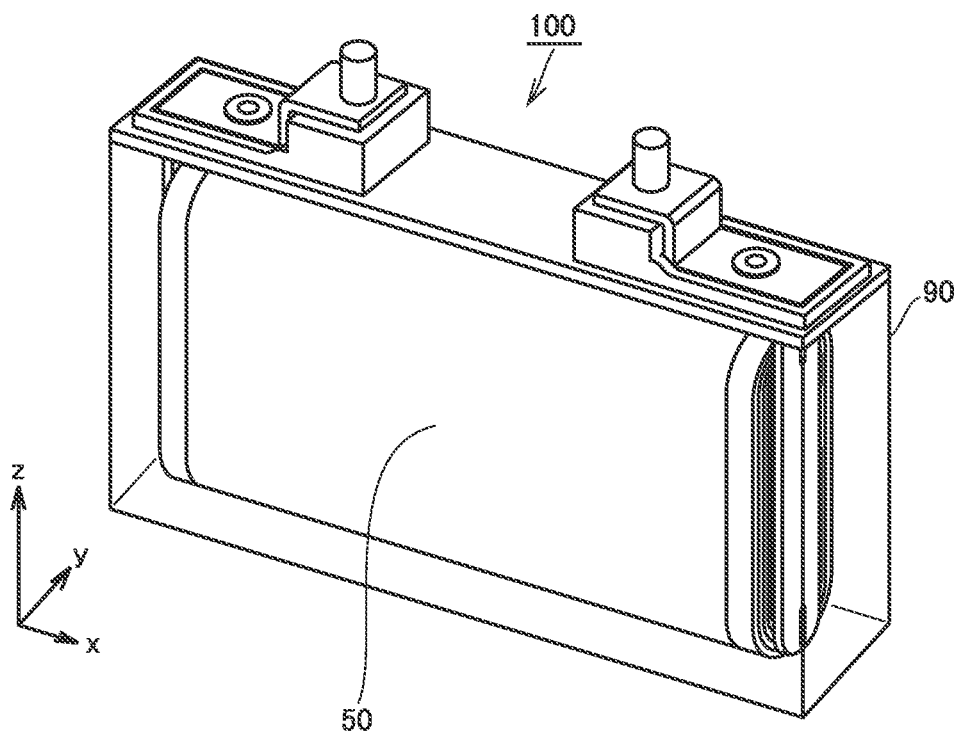
FIG. 6 is a schematic view of a lithium-ion battery according to the present embodiment.

FIG. 6 is a schematic view of a lithium-ion battery according to the present embodiment.

A battery 100 is a prismatic battery. Battery 100 includes a casing 90. Casing 90 has a rectangular outer profile. Casing 90 may be made of metal, for example. Casing 90 is hermetically sealed. Casing 90 accommodates a power storage element. The power storage element includes an electrode group 50 and an electrolyte (not illustrated).

Figure 7:
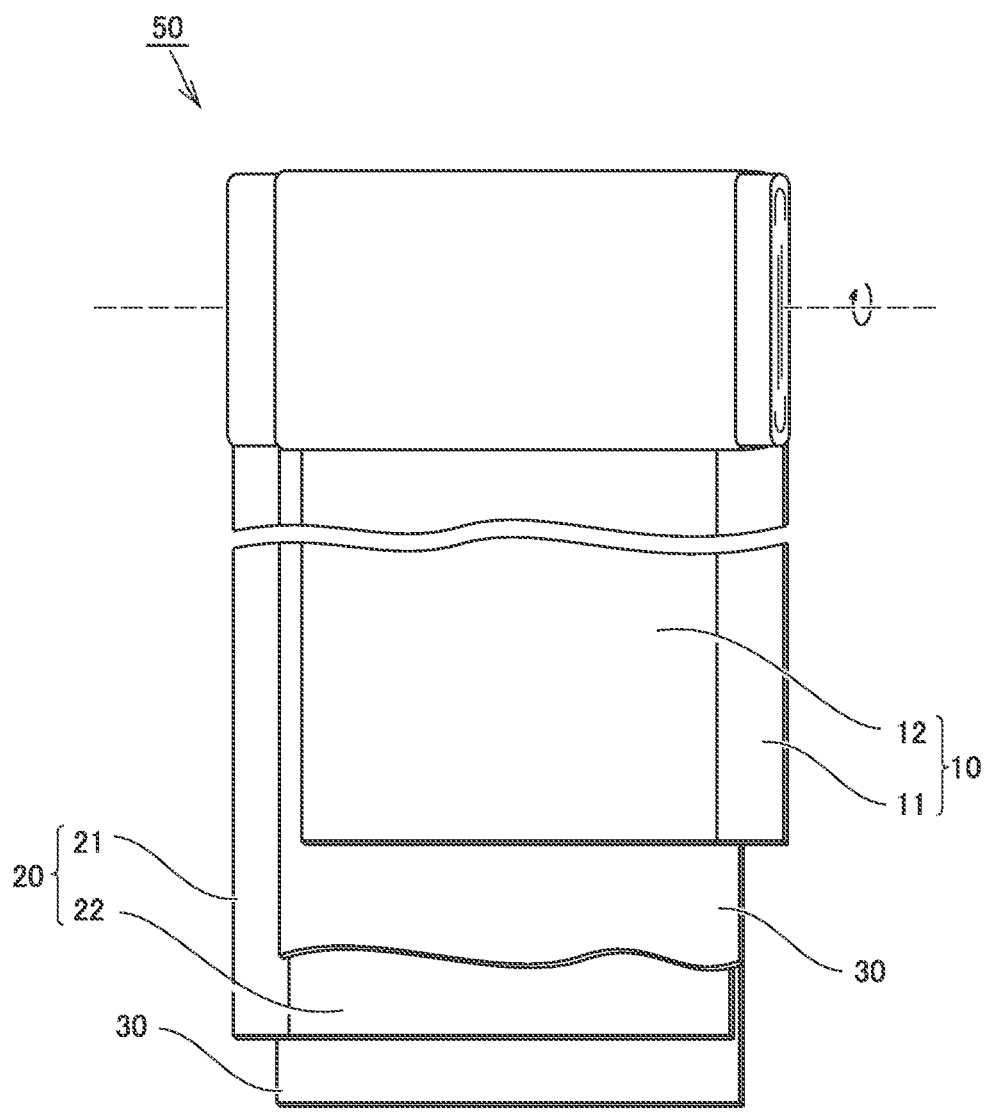
FIG. 7 is a schematic view of an electrode group according to the present embodiment.

FIG. 7 is a schematic view of an electrode group according to the present embodiment.

Electrode group 50 is a wound-type one. More specifically, electrode group 50 is formed by winding a positive electrode 10 and a negative electrode 20 in a spiral manner. A separator 30 is interposed between positive electrode 10 and negative electrode 20.

Electrode group 50 may be a stack-type one. More specifically, electrode group 50 may be formed by alternately stacking positive electrode 10 and negative electrode 20. Separator 30 is interposed between positive electrode 10 and negative electrode 20.

(Negative Electrode)

Negative electrode 20 includes a negative electrode current collector 21 and a negative electrode active material layer 22. Negative electrode current collector 21 may include a copper (Cu) foil and/or the like, for example. Negative electrode active material layer 22 is disposed on a surface of negative electrode current collector 21. Negative electrode active material layer 22 may be disposed on only one side of negative electrode current collector 21. Negative electrode active material layer 22 may be disposed on both sides of negative electrode current collector 21.

Negative electrode active material layer 22 includes at least a negative electrode active material. For example, a slurry including a negative electrode active material may be applied to a surface of negative electrode current collector 21 to form negative electrode active material layer 22.

The negative electrode active material includes graphite and SiO. The negative electrode active material may consist essentially of graphite and SiO. As long as a desired cycle life is obtained, the negative electrode active material may further include other components in addition to graphite and SiO. For example, the negative electrode active material may further include pure Si and/or the like.

Graphite and SiO may satisfy relation "graphite/SiO=80/20" to relation "graphite/SiO=99/1" (mass ratio), for example. Graphite and SiO may satisfy relation "graphite/SiO=85/15" to relation "graphite/SiO=95/5" (mass ratio), for example.

The "silicon oxide (SiO)" according to the present embodiment refers to a compound including Si and O. The composition ratio between Si and O is not limited. For example, SiO may be represented by general formula "$SiO_x$ ($0<x\leq 2$)". In this general formula, relation "$0.5\leq x\leq 1.5$" may be satisfied. SiO may further include an element other than Si and O. For example, SiO may include an impurity element inevitably entrapped during synthesis thereof. The content of the impurity element may be 1.0 mass % or less, for example.

The charging resistance of SiO affects the inherent current rate ($I_0$). The higher the charging resistance of SiO is, the lower the inherent current rate ($I_0$) tends to be. For example, SiO (particles) may be covered with a carbon material. This may reduce the charging resistance of SiO. As a result, the inherent current rate ($I_0$) may be increased. The higher the inherent current rate ($I_0$) is, the shorter the time required for initial charging may be.

As the particle size of SiO increases, the expansion coefficient of SiO expansion caused by Li insertion tends to increase. Accordingly, the slope of the curve in the SOC region where Li insertion into SiO is dominant may become steeper. In other words, in FIG. 1, for example, the first slope ($S_1$) may become steeper, and in FIG. 2, for example, the second slope ($S_2$) may become steeper. SiO may have a median diameter from 0.1 μm to 10 μm, for example. The median diameter refers to a particle size in volume-based particle size distribution at which the cumulative particle volume (accumulated from the side of small sizes) reaches 50% of the total particle volume.

Negative electrode active material layer 22 may further include a conductive material, a binder, and the like, in addition to the negative electrode active material. The conductive material may include any component. The conductive material may include at least one selected from the group consisting of carbon black, vapor grown carbon fiber (VGCF), carbon nanotube (CNT), and graphene flake, for example. The amount of the conductive material may be, for example, from 0.1 parts by mass to 10 parts by mass relative to 100 parts by mass of the negative electrode active material.

The binder may include any component. The binder may include at least one selected from the group consisting of carboxymethylcellulose (CMC), styrene-butadiene rubber (SBR), polyacrylic acid (PAA), and polyimide (PI), for example. The amount of the binder may be, for example, from 0.1 parts by mass to 10 parts by mass relative to 100 parts by mass of the negative electrode active material.

(Positive Electrode)

Positive electrode 10 includes a positive electrode current collector 11 and a positive electrode active material layer 12. Positive electrode current collector 11 may include an aluminum (Al) foil and/or the like, for example. Positive electrode active material layer 12 is disposed on a surface of positive electrode current collector 11. Positive electrode active material layer 12 may be disposed on only one side of positive electrode current collector 11. Positive electrode active material layer 12 may be disposed on both sides of positive electrode current collector 11.

Positive electrode active material layer 12 includes at least a positive electrode active material. For example, a slurry including a positive electrode active material may be applied to a surface of positive electrode current collector 11 to form positive electrode active material layer 12. The positive electrode active material may include any component. The positive electrode active material may include at least one selected from the group consisting of lithium cobalt oxide, lithium nickel oxide, lithium manganese oxide, lithium nickel cobalt manganese oxide, lithium nickel cobalt aluminate, and lithium iron phosphate, for example. Positive electrode active material layer 12 may further include a conductive material, a binder, and the like, in addition to the positive electrode active material.

(Separator)

Separator 30 physically separates positive electrode 10 from negative electrode 20. Separator 30 may include a polyolefin porous film and/or the like, for example. When battery 100 is a polymer battery, an all-solid-state battery, or the like, the electrolyte may function as a separator.

(Electrolyte)

The electrolyte conducts Li ions. The electrolyte does not conduct electrons.

The electrolyte may be a liquid electrolyte, a gelled electrolyte, or a solid electrolyte, for example. In other words, battery 100 may be a liquid-type battery, a polymer battery, or an all-solid-state battery.

The liquid electrolyte may include a solvent and a supporting electrolyte. The solvent may include at least one selected from the group consisting of ethylene carbonate (EC), propylene carbonate (PC), fluoroethylene carbonate (FEC), vinylene carbonate (VC), ethyl methyl carbonate (EMC), dimethyl carbonate (DMC), and diethyl carbonate (DEC), for example. The supporting electrolyte may include at least one selected from the group consisting of $LiPF_6$, $LiBF_4$ and $Li(FSO_2)_2N$, for example. The concentration of the supporting electrolyte may be from 0.5 mol/L to 2 mol/L, for example.

<<(b) Initial Charging>>

The method of producing a lithium-ion battery according to the present embodiment includes performing initial charging of battery 100. Initial charging is performed with a charging apparatus. The charging apparatus may be a charge-discharge apparatus. Initial charging may be performed in an environment at room temperature. For example, initial charging may be performed in an environment at a temperature from 15° C. to 30° C.

(Preparatory Experiment)

The inherent current rate ($I_0$) of battery 100 is checked in advance. For example, the inherent current rate ($I_0$) may change in accordance with the SiO charging resistance and/or the like. For example, the inherent current rate ($I_0$) may be from 0.3 C to 0.8 C. For example, the inherent current rate ($I_0$) of a battery having the same specifications as those of battery 100 of interest may be checked.

First, battery 100 is completely discharged. Then, battery 100 is charged from 0% SOC to 100% SOC at a current rate of 1 C, for example. During charging, the dimension of battery 100 is measured. The dimension of battery 100 reflects expansion of the negative electrode active material. Expansion of the negative electrode active material tends to be reflected in the dimension that stretches in the direction of electrode stacking. In the case of a prismatic battery, the thickness thereof may be measured, for example. The thickness is the dimension in the y-axis direction in FIG. 6. In the case of a cylindrical battery, the diameter may be measured, for example.

A rectangular coordinate system is created. The horizontal axis of the rectangular coordinate system represents the SOC. The vertical axis of the rectangular coordinate system represents the dimension. The relation between the SOC and the dimension during charging is plotted. As in FIG. 1, for example, the slope of the curve within the region with lower SOC may be steeper and the slope of the curve within the region with higher SOC may be less steep; in other words, relation "$S_1 > S_2$" may be satisfied. In this case, it is regarded as the current rate being lower than the inherent current rate ($I_0$).

Figure 2:
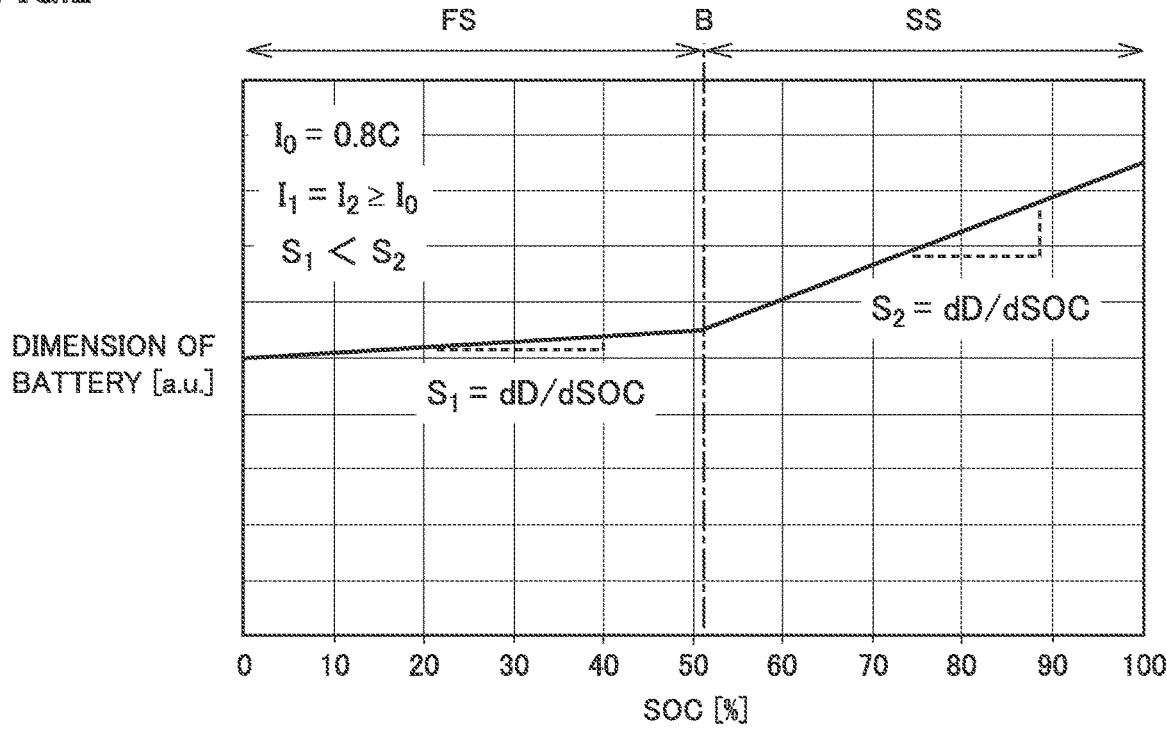
FIG. 2 is a second example of a charging profile obtained with a graphite-SiO mixed system.

As in FIG. 2, for example, the slope of the curve within the region with lower SOC may be less steep and the slope of the curve within the region with higher SOC may be steeper; in other words, relation "$S_1 < S_2$" may be satisfied. In this case, it is regarded as the current rate being equal to or higher than the inherent current rate ($I_0$).

For example, charging profile measurement is repeated at an interval of 0.1 C to identify the inherent current rate ($I_0$). After the inherent current rate ($I_0$) is identified, the first current rate ($I_1$) for use in the first stage (FS) of initial charging is determined. In the present embodiment, the first current rate ($I_1$) is determined so that relation "$I_1 < I_0$" is satisfied. For example, relation "$I_1/I_0 = 2/3$" to relation "$I_1/I_0 = 2/8$" may be satisfied. For example, relation "$I_1/I_0 = 5/8$" to relation "$I_1/I_0 = 2/8$" may be satisfied.

Further, a boundary (B) between the first stage (FS) and a second stage (SS) may be identified. For example, battery 100 is charged from 0% SOC to 100% SOC at the first current rate ($I_1$). The boundary (B) at which the slope of the curve changes is identified. The SOC region to the lower-SOC side of the boundary (B) is defined as the first stage (FS). The SOC region to the higher-SOC side of the boundary (B), including the boundary (B), is defined as the second stage (SS).

Initial charging may be performed without identifying the boundary (B). In this case, the slope "S=dD/dSOC" may be monitored during charging, for example. The "dD/dSOC" is the ratio of the increment of the dimension to the increment of SOC. For example, the slope between two adjacent measurement points, obtained from measurement, is calculated. The distance between measurement points (dSOC) may be 10%, for example. The slope is calculated sequentially. For example, the point between the $n^{th}$ slope and the $n-1^{th}$ slope where the $n^{th}$ slope is 50% of the $n-1^{th}$ slope or less may be regarded as the point at which the second stage (SS) starts.

(First Stage)

Based on results from the preparatory experiment, initial charging of battery 100 is performed. Initial charging may be performed in a constant-current mode, for example. The first stage (FS) is the SOC region from 0% to the boundary (B). In the present embodiment, at least charging in the first stage (FS) is performed at the first current rate ($I_1$). It is considered that Li insertion into SiO then saturates in the first stage (FS).

The first current rate ($I_1$) may have any lower limit as long as it is lower than the inherent current rate ($I_0$). Here, it should be noted that the lower the first current rate ($I_1$) is, the longer the time required for initial charging is. For example, the first current rate ($I_1$) may be 0.1 C or higher. For example, the first current rate ($I_1$) may be 0.2 C or higher.

(Second Stage)

After the SOC hits the boundary (B), charging is continued to reach an SOC at which thermal aging is to be performed. A second current rate ($I_2$) in the second stage (SS) may remain lower than the inherent current rate ($I_0$).

It is considered that Li insertion into SiO saturates in the first stage (FS). Therefore, the second current rate ($I_2$) in the second stage (SS) may be equal to or higher than the inherent current rate ($I_0$). In other words, relation "$I_2 \geq I_0$" may be satisfied. This may reduce the time required for initial charging. For example, relation "$I_2/I_0 = 2/0.8$" to relation "$I_2/I_0 = 2/0.3$" may be satisfied. The second current rate ($I_2$) may have any upper limit. Here, it should be noted that, when the second current rate ($I_2$) is too high, Li precipitation may occur. For example, the second current rate ($I_2$) may be 3 C or lower. For example, the second current rate ($I_2$) may be 2 C or lower.

<<(c) Thermal Aging>>

The method of producing a lithium-ion battery according to the present embodiment includes performing thermal aging of battery 100. In the present embodiment, after initial charging proceeds to the second stage (SS), thermal aging is performed at an SOC included in the second stage (SS).

The "thermal aging" according to the present embodiment refers to leaving battery 100 in an environment at a temperature of 40° C. or higher for a predetermined period of time. For example, battery 100 may be left in a thermostatic chamber that is set at a predetermined temperature. In the present embodiment, as long as the temperature setting for the thermostatic chamber is 60° C., it is regarded as thermal aging being performed in an environment at a temperature of 60° C.

For example, the temperature of the environment for thermal aging may be from 40° C. to 80° C. For example, the temperature of the environment for thermal aging may be from 40° C. to 70° C. For example, the temperature of the environment for thermal aging may be from 50° C. to 70° C.

For example, the time period for thermal aging may be from 6 hours to 120 hours. For example, the time period for thermal aging may be from 12 hours to 96 hours. For example, the time period for thermal aging may be from 24 hours to 72 hours.

In the above manner, a lithium-ion battery is produced. In the present embodiment, it is considered that Li insertion into SiO is saturated in the first stage (FS) of initial charging. In other words, it is considered that Li insertion into SiO is saturated in the lower SOC region. It is considered that thermal aging performed after saturation of Li insertion into SiO leads to formation of a dense Si network structure, which may lead to an enhanced cycle life.

<<Variations>>

In a battery pack, for example, batteries 100 (cells) of the battery pack may be restrained so that the dimensions of batteries 100 are less likely to change. For example, use of a load sensor may be considered as a variation. More specifically, instead of the dimension of battery 100, a load applied to a load sensor by battery 100 may be measured. The load sensor may be a tactile sensor and/or the like, for example. The load sensor is positioned so that it can measure an increase in load caused by expansion of the negative electrode active material. For example, the load sensor may be positioned between cells in a battery pack.

In another variation, the first stage (FS), the second stage (SS), and the inherent current rate ($I_0$) may be determined on a rectangular coordinate system that has the SOC of battery 100 on the horizontal axis and the load on the vertical axis.

EXAMPLES

Next, examples according to the present disclosure (herein also called "the present example") are described. It should be noted that the description below does not limit the scope of claims.

In the present example, the thickness of the battery is used as the dimension of the battery.

Experiment 1: Example 1 to Example 4,
Comparative Example 1 to Comparative Example 4

Lithium-ion batteries were produced by below-described production methods.

Example 1

1. (a) Assembling

Figure 1:
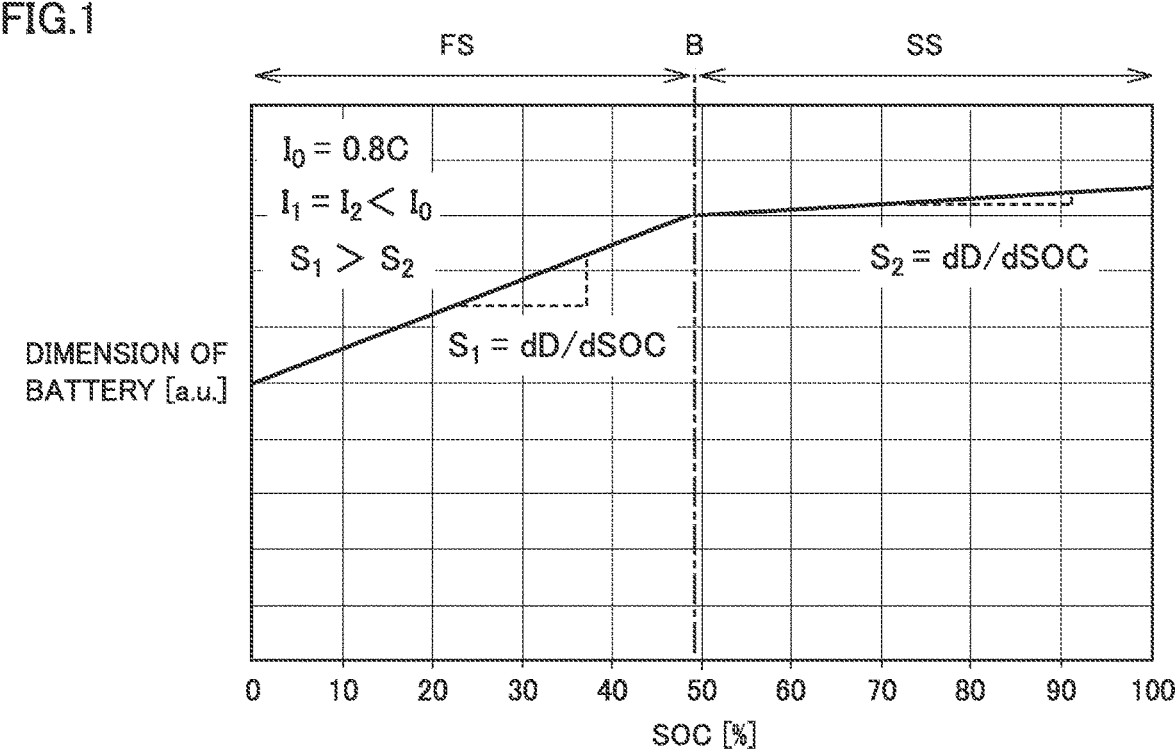
FIG. 1 is a first example of a charging profile obtained with a graphite-SiO mixed system.

A battery having the below configuration was assembled.
Positive electrode active material: $LiNi_{1/3}Co_{1/3}Mn_{1/3}O_2$
Negative electrode active material: Graphite/SiO=85/15
Inherent current rate ($I_0$): 0.8 C FIG. 1 is a first example of a charging profile obtained with a graphite-SiO mixed system. FIG. 1 presents the charging profile obtained when the battery with the configuration of Experiment 1 was charged at a current rate lower than the inherent current rate ($I_0$).

FIG. 2 is a second example of a charging profile obtained with a graphite-SiO mixed system. FIG. 2 presents the charging profile obtained when the battery with the configuration of Experiment 1 was charged at a current rate equal to or higher than the inherent current rate ($I_0$).

2. (b) Initial Charging 2-1. First Stage (FS)

In an environment at a temperature of 25° C., charging in the first stage (FS) was completed at a first current rate ($I_1$) of 0.5 C. In other words, charging in the first stage (FS) was performed at a first current rate ($I_1$) lower than the inherent current rate ($I_0$).

2-2. Second Stage (SS)

In an environment at a temperature of 25° C., charging in the second stage (SS) was performed at a second current rate ($I_2$) of 2 C. In other words, after initial charging proceeded to the second stage (SS), charging was performed at a second current rate ($I_2$) equal to or higher than the inherent current rate ($I_0$). Charging was continued until 100% SOC was reached.

3. (c) Thermal Aging

After 100% SOC was reached, thermal aging was performed at 100% SOC. In other words, after initial charging proceeded to the second stage (SS), thermal aging was performed at an SOC included in the second stage (SS). The temperature of the environment for thermal aging was 60° C. The time period for thermal aging was 48 hours.

Under the "Thermal aging" column in Table 1 below, "100 (Second stage)", for example, means that "thermal aging was performed at 100% SOC" and "the SOC at which thermal aging was performed was included in the second stage (SS)".

4. Cycle Test

The initial capacity of the battery was measured. After the initial capacity measurement, a cycle test was performed under the below-described conditions.

(Cycle Test Conditions)
Test temperature: 25° C.
Voltage range: 3.0 V (SOC=0%) to 4.2 V (SOC=100%)
Charging: Constant current-constant voltage mode, Current rate=0.5 C
Discharging: Constant-current mode, Current rate=0.5 C
Number of cycles: 500 Cycles After the cycle test, the capacity of the battery was measured. This post-cycle-test capacity was divided by the initial capacity to obtain a post-500-cycle capacity retention. The value in the "Post-500-cycle capacity retention" column in Table 1 below is a value relative to the capacity retention in Example 1, which is defined as 100.0. It is considered that the greater the value in the "Post-500-cycle capacity retention" column is, the more enhanced the cycle life is.

Example 2

A lithium-ion battery was produced in the same manner as in Example 1 except that the SOC for thermal aging was changed as specified in Table 1 below.

Example 3

A lithium-ion battery was produced in the same manner as in Example 2 except that the first current rate ($I_1$) was changed as specified in Table 1 below.

Example 4

A lithium-ion battery was produced in the same manner as in Example 2 except that the second current rate ($I_2$) was changed as specified in Table 1 below.

Comparative Example 1

At a first current rate ($I_1$) of 0.5 C, charging was performed to reach 30% SOC. At 30% SOC, thermal aging was performed. Except these, the same manner as in Example 1 was adopted to produce a lithium-ion battery.

Comparative Example 2

A lithium-ion battery was produced in the same manner as in Example 1 except that the first current rate ($I_1$) and the second current rate ($I_2$) were changed as specified in Table 1 below.

Comparative Example 3

A lithium-ion battery was produced in the same manner as in Comparative Example 1 except that the first current rate ($I_1$) was changed as specified in Table 1 below.

Comparative Example 4

A lithium-ion battery was produced in the same manner as in Example 2 except that the first current rate ($I_1$) was changed as specified in Table 1 below.

TABLE 1

| | (a) Assembling | | (b) Initial charging | | | |
|---|---|---|---|---|---|---|
| Experiment 1 | Negative electrode active material Graphite/SiO | Inherent current rate ($I_0$) [C] | First stage First current rate ($I_1$) [C] | Second stage Second current rate ($I_2$) [C] | (c) Thermal aging 60° C., 48 hours SOC [%] | Cycle life Post-500-cycle capacity retention[1] [—] |
| Ex. 1 | 85/15 | 0.8 | 0.5 | 2 | 100 (Second stage) | 100.0 |
| Ex. 2 | 85/15 | 0.8 | 0.5 | 2 | 60 (Second stage) | 99.6 |
| Ex. 3 | 85/15 | 0.8 | 0.2 | 2 | 60 (Second stage) | 102.5 |
| Ex. 4 | 85/15 | 0.8 | 0.5 | 0.5 | 60 (Second stage) | 99.5 |
| Comp. Ex. 1 | 85/15 | 0.8 | 0.5 | — | 30 (First stage) | 94.0 |
| Comp. Ex. 2 | 85/15 | 0.8 | 2 | 0.5 | 100 (Second stage) | 95.5 |
| Comp. Ex. 3 | 85/15 | 0.8 | 2 | — | 30 (First stage) | 91.3 |
| Comp. Ex. 4 | 85/15 | 0.8 | 2 | 2 | 60 (Second stage) | 90.0 |

[1]The value is relative to the capacity retention in Example 1, which is defined as 100.0.

<<Results>>

As seen in Table 1 above, it is indicated that Example 1 has a long cycle life. In Example 1, charging in the first stage (FS) is performed at a first current rate ($I_1$) lower than the inherent current rate ($I_0$) (FIG. 1). Therefore, it is considered that Li insertion into SiO is saturated in the first stage (FS). Further, thermal aging is performed at an SOC included in the second stage (SS). Therefore, it is considered that a dense Si network structure is formed.

It is indicated that Example 2 has a long cycle life as in Example 1. In Example 2, the SOC for thermal aging is lower than in Example 1. However, the SOC for thermal aging is included in the second stage (SS) and therefore it is considered that a dense Si network structure is formed.

It is indicated that Example 3 has a longer cycle life than in Example 2. In Example 3, the first current rate ($I_1$) is lower than in Example 2. It is considered that this leads to formation of an even denser Si network structure. Here, it is considered that, in Example 3, the time required for initial charging is longer than in Example 2.

It is indicated that Example 4 has a long cycle life as in Example 2. In Example 4, the second current rate ($I_2$) is lower than in Example 2. It is considered that this increases the time required for initial charging in Example 4, compared to Example 2.

It is indicated that Comparative Example 1 has a short cycle life. In Comparative Example 1, thermal aging is performed in the first stage (FS). In other words, it is considered that thermal aging is performed before saturation of Li insertion into SiO. Because of this, it is considered that formation of a dense Si network structure is less likely to occur.

It is indicated that Comparative Example 2 has a short cycle life. In Comparative Example 2, charging in the first stage (FS) is performed at a first current rate ($I_1$) equal to or higher than the inherent current rate ($I_0$). Because of this, it is considered that Li insertion into SiO occurs more often in the second stage (SS) (FIG. 2). In Comparative Example 2, charging in the second stage (SS) is performed to reach 100% SOC, but it is considered that Li insertion into SiO has not yet been saturated. Due to this insufficient Li insertion into SiO, it is considered that formation of a dense Si network structure is less likely to occur.

It is indicated that Comparative Example 3 has a short cycle life. In Comparative Example 3, charging in the first stage (FS) is performed at a first current rate ($I_1$) equal to or higher than the inherent current rate ($I_0$). Because of this, it is considered that Li insertion into SiO occurs more often in the second stage (SS) (FIG. 2). In Comparative Example 3, thermal aging is performed in the first stage (FS) before saturation of Li insertion into SiO. Because of this, it is considered that formation of a dense Si network structure is less likely to occur.

It is indicated that Comparative Example 4 has a short cycle life. In Comparative Example 4, charging in the first stage (FS) is performed at a first current rate ($I_1$) equal to or higher than the inherent current rate ($I_0$). Because of this, it is considered that Li insertion into SiO occurs more often in the second stage (SS) (FIG. 2). Further, in Comparative Example 4, the second current rate ($I_2$) in the second stage (SS) is also high. Because of this, it is considered that Li insertion into SiO is less likely to occur. When Li insertion into SiO is less likely to occur, formation of a dense Si network structure may also be less likely to occur.

Experiment 2: Example 5, Comparative Example 5, Comparative Example 6>

Lithium-Ion Batteries were Produced by Below-Described Production Methods

Example 5

1. (a) Assembling
A battery having the below configuration was assembled.
Positive electrode active material: $LiNi_{1/3}Co_{1/3}Mn_{1/3}O_2$
Negative electrode active material: Graphite/SiO=95/5
Inherent current rate ($I_0$): 0.3 C
It is considered that the SiO used in Experiment 2 had a high charging resistance compared to the SiO used in Experiment 1.

Figure 3:
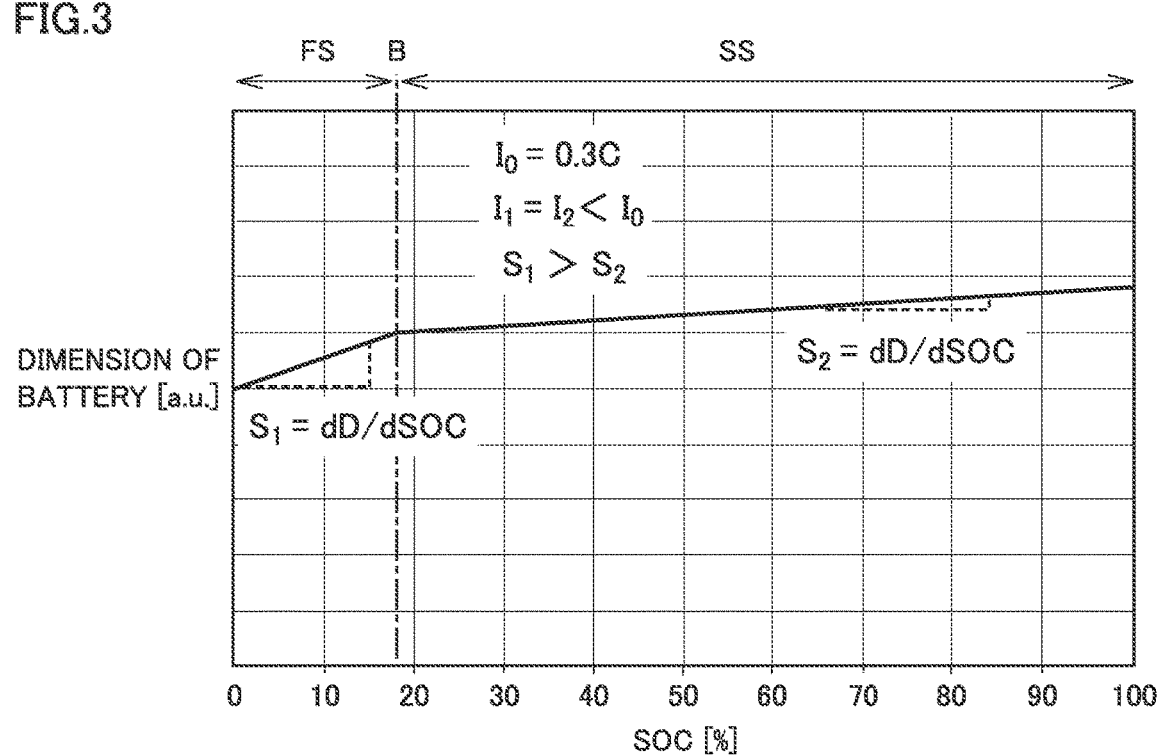
FIG. 3 is a third example of a charging profile obtained with a graphite-SiO mixed system.

FIG. 3 is a third example of a charging profile obtained with a graphite-SiO mixed system. FIG. 3 presents the charging profile obtained when the battery with the configuration of Experiment 2 was charged at a current rate lower than the inherent current rate ($I_0$).

Figure 4:
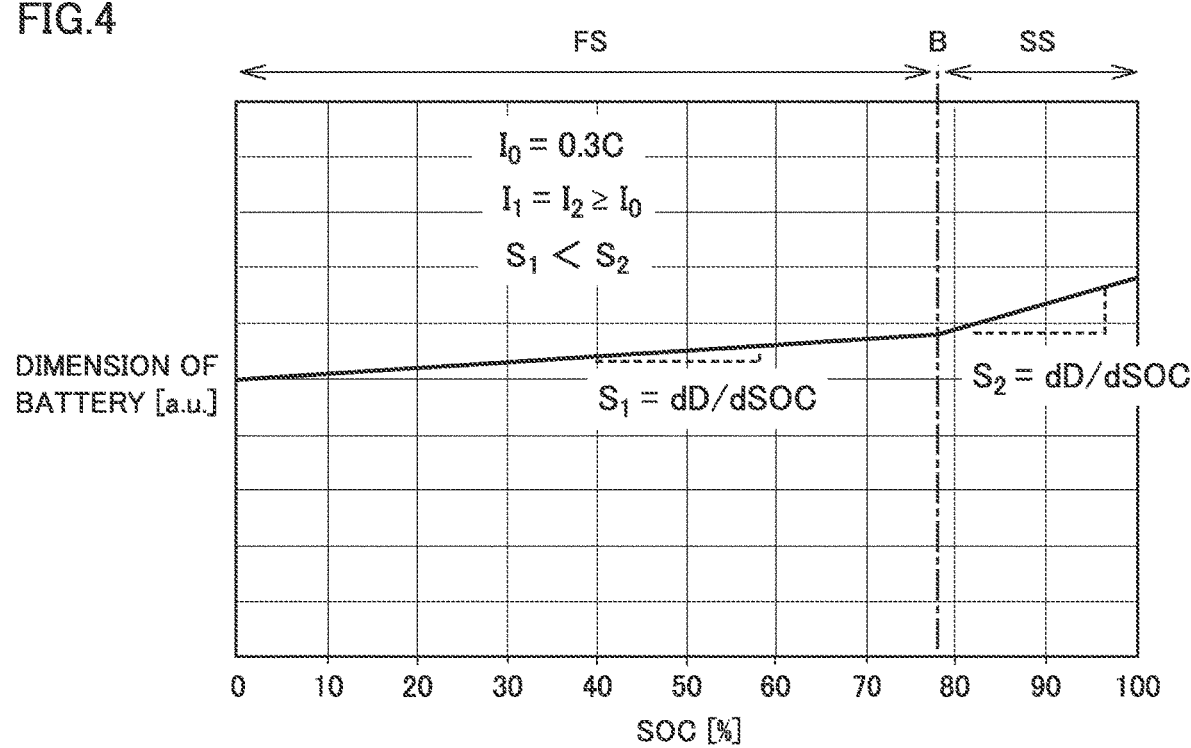
FIG. 4 is a fourth example of a charging profile obtained with a graphite-SiO mixed system.

FIG. 4 is a fourth example of a charging profile obtained with a graphite-SiO mixed system. FIG. 4 presents the charging profile obtained when the battery with the configuration of Experiment 2 was charged at a current rate equal to or higher than the inherent current rate ($I_0$).

2. (b) Initial Charging
2-1. First Stage (FS)
In an environment at a temperature of 25° C., charging in the first stage (FS) was completed at a first current rate ($I_1$)

of 0.2 C. In other words, charging in the first stage (FS) was performed at a first current rate ($I_1$) lower than the inherent current rate ($I_0$).

2-2. Second Stage (SS)

In an environment at a temperature of 25° C., charging in the second stage (SS) was performed at a second current rate ($I_2$) of 2 C. In other words, after initial charging proceeded to the second stage (SS), charging was performed at a second current rate ($I_2$) equal to or higher than the inherent current rate ($I_0$). Charging was continued until 30% SOC was reached.

3. (c) Thermal Aging

After 30% SOC was reached, thermal aging was performed at 30% SOC. In other words, after initial charging proceeded to the second stage (SS), thermal aging was performed at an SOC included in the second stage (SS). The temperature of the environment for thermal aging was 60° C. The time period for thermal aging was 48 hours.

4. Cycle Test

Post-500-cycle capacity retention was measured in the same manner as in Experiment 1. The value in the "Post-500-cycle capacity retention" column in Table 2 below is a value relative to the capacity retention in Example 5, which is defined as 100.0. It is considered that the greater the value in the "Post-500-cycle capacity retention" column is, the more enhanced the cycle life is.

Comparative Example 5

At a first current rate ($I_1$) of 0.2 C, charging was performed to reach 10% SOC. At 10% SOC, thermal aging was performed. Except these, the same manner as in Example 5 was adopted to produce a lithium-ion battery.

Comparative Example 6

At a first current rate ($I_1$) of 0.5 C, charging was performed to reach 60% SOC. At 60% SOC, thermal aging was performed. Except these, the same manner as in Example 5 was adopted to produce a lithium-ion battery.

considered that thermal aging is performed before saturation of Li insertion into SiO. Because of this, it is considered that formation of a dense Si network structure is less likely to occur.

It is indicated that Comparative Example 6 has a short cycle life. In Comparative Example 6, charging in the first stage (FS) is performed at a first current rate ($I_1$) equal to or higher than the inherent current rate ($I_0$). Because of this, it is considered that Li insertion into SiO occurs more often in the second stage (SS) (FIG. 4). In Comparative Example 6, thermal aging is performed in the first stage (FS) before saturation of Li insertion into SiO. Because of this, it is considered that formation of a dense Si network structure is less likely to occur.

The present embodiment and the present example are illustrative in any respect. The present embodiment and the present example are non-restrictive. The technical scope defined by the terms of the claims encompasses any modifications within the meaning equivalent to the terms of the claims. The technical scope defined by the terms of the claims encompasses any modifications within the scope equivalent to the terms of the claims.

What is claimed is:

1. A method of producing a lithium-ion battery, comprising:
    assembling a battery;
    performing initial charging of the battery; and
    performing thermal aging of the battery,
    the battery including a negative electrode active material,
    the negative electrode active material including graphite and silicon oxide,
    wherein a charging profile of the battery is indicated on a rectangular coordinate system having a state of charge of the battery on a horizontal axis and a dimension of the battery on a vertical axis, wherein
    the charging profile of the battery has a first stage and a second stage,
    the second stage has a higher state of charge compared to the first stage, and

TABLE 2

| | (a) Assembling | | (b) Initial charging | | | |
|---|---|---|---|---|---|---|
| | Negative electrode active material | Inherent current rate ($I_0$) [C] | First stage First current rate ($I_1$) [C] | Second stage Second current rate ($I_2$) [C] | (c) Thermal aging 60° C., 48 hours SOC [%] | Cycle life Post-500-cycle capacity retention[1] [—] |
| Experiment 2 | Graphite/SiO | | | | | |
| Ex. 5 | 95/5 | 0.3 | 0.2 | 2 | 30 (Second stage) | 100.0 |
| Comp. Ex. 5 | 95/5 | 0.3 | 0.2 | — | 10 (First stage) | 94.3 |
| Comp. Ex. 6 | 95/5 | 0.3 | 0.5 | — | 60 (First stage) | 89.8 |

[1]The value is relative to the capacity retention in Example 5, which is defined as 100.0.

<<Results>>

As seen in Table 2 above, it is indicated that Example 5 has a long cycle life. In Example 5, charging in the first stage (FS) is performed at a first current rate ($I_1$) lower than the inherent current rate ($I_0$) (FIG. 3). Therefore, it is considered that Li insertion into SiO is saturated in the first stage (FS). Further, thermal aging is performed at an SOC included in the second stage (SS). Therefore, it is considered that a dense Si network structure is formed.

It is indicated that Comparative Example 5 has a short cycle life. In Comparative Example 5, thermal aging is performed in the first stage (FS). In other words, it is the charging profile has a first slope in the first stage and has a second slope in the second stage,
the battery having a boundary current rate at which the charging profile changes from the first stage to the second stage, wherein
when the battery is charged at a current rate equal to or higher than the boundary current rate, the first slope is less steep than the second slope, and
when the battery is charged at a current rate lower than the boundary current rate, the first slope is steeper than the second slope, during the initial charging, at least charging in the first stage being performed at a current rate lower than the boundary current rate, the first stage being completed when lithium insertion into the silicon oxide is saturated, and after the initial charging proceeds to the second stage, the thermal aging being performed at a state of charge included in the second stage.

2. The method of producing a lithium-ion battery according to claim 1, wherein, after the initial charging proceeds to the second stage, charging is performed at a current rate equal to or higher than the boundary current rate.

3. The method of producing a lithium-ion battery according to claim 1, wherein the second stage is completed when the state of charge of the battery is 100%.

4. The method of producing a lithium-ion battery according to claim 1, wherein the thermal aging is performed in an environment of from 40° C. to 80° C. for from 6 hours to 120 hours.

* * * * *